(12) United States Patent
Tang et al.

(10) Patent No.: US 12,526,524 B2
(45) Date of Patent: Jan. 13, 2026

(54) SYSTEM AND METHOD FOR DETERMINING WHEN TO ZOOM ONTO BARCODE OR OTHER OPTICAL CODE USING IMAGING SENSOR OF MOBILE DEVICE

(71) Applicant: Samsung Electronics Co., Ltd., Suwon-si (KR)

(72) Inventors: Zhicheng Tang, Columbia, MO (US); Haichao Zhang, Santa Clara, CA (US); Ji Liang, Salt Lake City, UT (US); Sia Jeffry Saputra, Sunnyvale, CA (US); Rathinamoorthy Mylsamy, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 18/458,793

(22) Filed: Aug. 30, 2023

(65) Prior Publication Data

US 2024/0365004 A1  Oct. 31, 2024

Related U.S. Application Data

(60) Provisional application No. 63/461,849, filed on Apr. 25, 2023.

(51) Int. Cl.
*H04N 23/69* (2023.01)
*G06K 7/14* (2006.01)
*H04N 23/61* (2023.01)

(52) U.S. Cl.
CPC ........... *H04N 23/69* (2023.01); *G06K 7/1443* (2013.01); *H04N 23/61* (2023.01)

(58) Field of Classification Search
CPC ....... H04N 23/69; H04N 23/61; G06K 7/1443
See application file for complete search history.

(56) References Cited

U.S. PATENT DOCUMENTS 8,040,399 B2  10/2011  Georgis et al.
9,195,873 B2  11/2015  Gopalakrishnan et al.
(Continued)

FOREIGN PATENT DOCUMENTS

JP   H11-324235 A    11/1999
WO   2022260258 A1   12/2022

OTHER PUBLICATIONS

Dynamsoft Developers Blog, "QR Code Scanning: Zoom From a Distance," dynamsoft.com, May 2021, 10 pages.
(Continued)

*Primary Examiner* — Christopher K Peterson

(57) ABSTRACT

A method includes obtaining a first image frame captured using at least one imaging sensor. The method also includes determining that an optical code is contained within the first image frame and determining whether to automatically zoom onto the optical code. The method further includes, in response to determining to automatically zoom onto the optical code, identifying a zoom ratio to be applied. In addition, the method includes controlling the at least one imaging sensor to capture a second image frame that is zoomed onto the optical code using the zoom ratio. Determining whether to automatically zoom onto the optical code includes identifying a distance between the optical code and a nearest edge or a nearest corner in the first image frame and determining to automatically zoom onto the optical code based on the identified distance being greater than a threshold distance.

20 Claims, 6 Drawing Sheets

(56) References Cited

U.S. PATENT DOCUMENTS

| | | | |
|---|---|---|---|
| 9,781,350 B2 | 10/2017 | Gao et al. | |
| 11,244,147 B2 | 2/2022 | Floerkemeier et al. | |
| 11,265,474 B2 | 3/2022 | Dolgin et al. | |
| 11,561,678 B1 | 1/2023 | Shang et al. | |
| 2015/0363625 A1* | 12/2015 | Wu | G06K 7/1447 |
| | | | 382/203 |
| 2022/0377241 A1 | 11/2022 | Miyake et al. | |
| 2023/0214960 A1* | 7/2023 | Choudhary | H04N 23/69 |
| | | | 382/298 |
| 2023/0283876 A1* | 9/2023 | Yoo | H04N 23/61 |

OTHER PUBLICATIONS

Tran, "Auto-zoom feature for QR Code scanner with Google vision," stackoverflow.com, Sep. 2019, 2 pages.

"Barcode scanner apps for Android—javatpoint," javapoint.com, 2021, 13 pages.

"qr_scanner_plus | Flutter Package," pub.dev, Aug. 2022, 8 pages.

Molenaar, "11 Top QR Scanners to Download to Your Mobile Device," influencermarketinghub.com, Oct. 2021, 18 pages.

Huawei Developer, "Scan Kit—HMS Core," Mar. 2020, 8 pages.

Funcode Technology, "Industrial 2D Barcode Solutions—Funcode Technology," funcode-tech.com, Nov. 2021, 13 pages.

DENSO International America, "Inventor of the QR Code Develops a New Reader Application," prnewswire.com, Jun. 2010, 5 pages.

Apps Wing, "QR Scanner—Barcode Reader," apkfab.com, Sep. 2021, 6 pages.

Tan et al., "EfficientDet: Scalable and Efficient Object Detection," Proceedings of the IEEE/CVF Conference on Computer Vision and Pattern Recognition, 2020, 10 pages.

Kundu, "YOLO Algorithm for Object Detection Explained [+Examples]," v7labs.com, Jan. 2023, 25 pages.

* cited by examiner

SYSTEM AND METHOD FOR DETERMINING WHEN TO ZOOM ONTO BARCODE OR OTHER OPTICAL CODE USING IMAGING SENSOR OF MOBILE DEVICE

CROSS-REFERENCE TO RELATED APPLICATION AND PRIORITY CLAIM

This application claims priority under 35 U.S.C. § 119 (e) to U.S. Provisional Patent Application No. 63/461,849 filed on Apr. 25, 2023. This provisional application is hereby incorporated by reference in its entirety.

TECHNICAL FIELD

This disclosure relates generally to imaging systems and processes. More specifically, this disclosure relates to a system and method for determining when to zoom onto a barcode or other optical code using an imaging sensor of a mobile device.

BACKGROUND

Mobile electronic devices, such as smartphones and tablet computers, routinely include cameras that allow users to capture images of their surrounding environments. In addition to image capture, another common use of cameras in mobile electronic devices involves scanning barcodes or other optical codes in order to obtain information, such as information about a product or service. In some cases, once an optical code is scanned, a user can be given the option of viewing information retrieved from the optical code or a resource (such as a website) identified by the optical code.

SUMMARY

This disclosure relates to a system and method for determining when to zoom onto a barcode or other optical code using an imaging sensor of a mobile device.

In a first embodiment, a method includes obtaining a first image frame captured using at least one imaging sensor. The method also includes determining that an optical code is contained within the first image frame and determining whether to automatically zoom onto the optical code. The method further includes, in response to determining to automatically zoom onto the optical code, identifying a zoom ratio to be applied. In addition, the method includes controlling the at least one imaging sensor to capture a second image frame that is zoomed onto the optical code using the zoom ratio. Determining whether to automatically zoom onto the optical code includes identifying a distance between the optical code and a nearest edge or a nearest corner in the first image frame and determining to automatically zoom onto the optical code based on the identified distance being greater than a threshold distance.

In a second embodiment, an electronic device includes at least one imaging sensor configured to capture a first image frame. The electronic device also includes at least one processing device configured to determine that an optical code is contained within the first image frame and determine whether to automatically zoom onto the optical code. The at least one processing device is also configured, in response to determining to automatically zoom onto the optical code, to identify a zoom ratio to be applied. The at least one processing device is further configured to control the at least one imaging sensor to capture a second image frame that is zoomed onto the optical code using the zoom ratio. To determine whether to automatically zoom onto the optical code, the at least one processing device is configured to identify a distance between the optical code and a nearest edge or a nearest corner in the first image frame and determine to automatically zoom onto the optical code based on the identified distance being greater than a threshold distance.

In a third embodiment, a non-transitory machine-readable medium contains instructions that when executed cause at least one processor of an electronic device to obtain a first image frame captured using at least one imaging sensor. The non-transitory machine-readable medium also contains instructions that when executed cause the at least one processor to determine that an optical code is contained within the first image frame and determine whether to automatically zoom onto the optical code. The non-transitory machine-readable medium further contains instructions that when executed cause the at least one processor, in response to determining to automatically zoom onto the optical code, to identify a zoom ratio to be applied. In addition, the non-transitory machine-readable medium contains instructions that when executed cause the at least one processor to control the at least one imaging sensor to capture a second image frame that is zoomed onto the optical code using the zoom ratio. The instructions that when executed cause the at least one processor to determine whether to automatically zoom onto the optical code include instructions that when executed cause the at least one processor to identify a distance between the optical code and a nearest edge or a nearest corner in the first image frame and determine to automatically zoom onto the optical code based on the identified distance being greater than a threshold distance.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
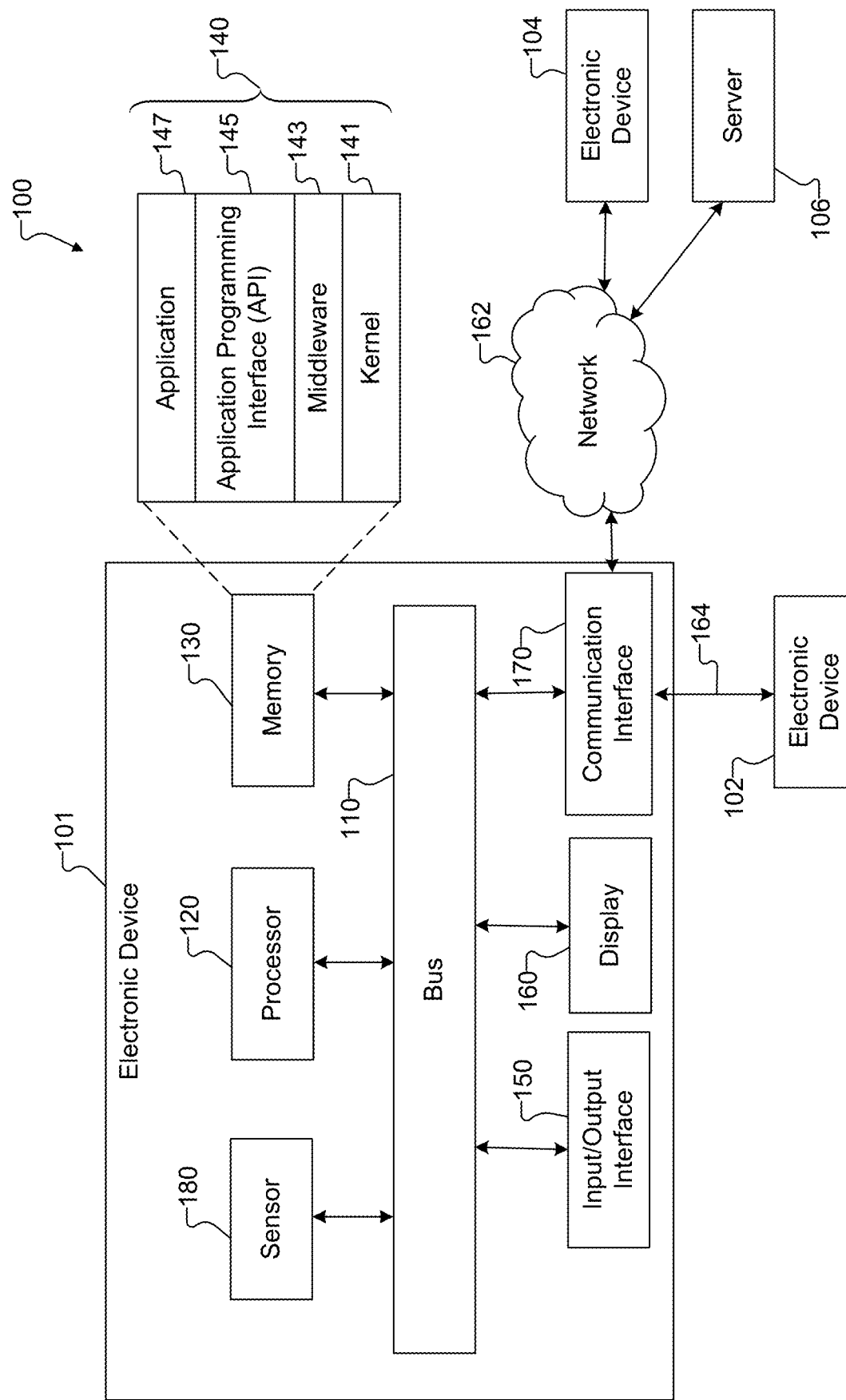
FIG. 1 illustrates an example network configuration including an electronic device according to this disclosure.

FIGS. 1 through 7, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, mobile electronic devices, such as smartphones and tablet computers, routinely include cameras that allow users to capture images of their surrounding environments. In addition to image capture, another common use of cameras in mobile electronic devices involves scanning barcodes or other optical codes in order to obtain information, such as information about a product or service. In some cases, once an optical code is scanned, a user can be given the option of viewing information retrieved from the optical code or a resource (such as a website) identified by the optical code.

Current optical scanning approaches often use a scan engine that can detect optical codes at close distances relative to a user's mobile device. However, at farther distances, an optical code tends to appear relatively small within a camera's normal view, and the scan engine typically will not recognize the optical code even if the camera is able to capture sufficient information for decoding of the optical code. This may primarily be caused by the scan engine being configured to use a predefined detection region within the camera's view and operating under the assumption that larger optical codes will be present at or near the center of the camera's view. Moreover, due to computational costs, the scan engine typically does not attempt to identify smaller regions within the camera's view that might contain optical codes. While a user could manually cause the camera to zoom in or zoom out (such as by pinching in or out on a display screen of the user's mobile device) in order to detect smaller optical codes, this tends to be very inconvenient for the user.

This disclosure provides various techniques for determining when to zoom onto a barcode or other optical code using at least one imaging sensor of a mobile device. As described in more detail below, a first image frame captured using at least one imaging sensor is obtained, such as when an image frame is captured by a user's mobile electronic device. A determination is made that an optical code is contained within the first image frame, and a determination is made whether to automatically zoom onto the optical code. In response to determining to automatically zoom onto the optical code, a zoom ratio to be applied is identified, and the at least one imaging sensor is controlled to capture a second image frame that is zoomed onto the optical code using the zoom ratio.

There are various ways in which a determination whether to automatically zoom onto an optical code can be made. For example, a distance between the optical code and a nearest edge or a nearest corner in the first image frame can be identified, and a determination can be made to automatically zoom onto the optical code if the identified distance is greater than a threshold distance. A probable position of the optical code within the first image frame and a confidence score representing a likelihood of the optical code being at the probable position can be identified, a determination can be made whether the confidence score exceeds a threshold confidence score, an occupancy rate of the optical code within the first image frame can be determined based on a ratio of an area of the optical code within the first image frame and an area of the first image frame when the confidence score exceeds the threshold confidence score, and a determination can be made to automatically zoom onto the optical code if the occupancy rate is less than a threshold occupancy rate. A determination can be made to automatically zoom onto the optical code if the at least one imaging sensor was not moving by at least a threshold amount when the first image frame was captured. An image quality of the first image frame can be determined, and a determination can be made to automatically zoom onto the optical code if the image quality exceeds a threshold quality. An attempt to decode the optical code using the first image frame can be made in parallel with determining whether to automatically zoom onto the optical code, and a determination can be made to automatically zoom onto the optical code after failing to decode the optical code using the first image frame. Any of these factors may be used individually, or any suitable combination of these factors may be used collectively.

In this way, the described techniques support automatic identification of optical codes within captured image frames and (if appropriate) automatic zooming onto the optical codes based on desired zoom ratios. Among other things, this can enable more effective scanning of the optical codes, even when the optical codes are relatively far from the electronic devices performing the scanning. Moreover, the desired zoom ratios can vary based on a number of factors, allowing for the scanning of optical codes having different sizes or the scanning of optical codes at various distances from the electronic devices. Further, the determination whether to automatically adjust the zoom of at least one imaging sensor in order to scan an optical code can be dynamic and incorporate a consideration of various factors, which can help to reduce or minimize the likelihood of zooming onto an optical code when a user does not wish to do so. Thus, for instance, automatic zooming may be avoided when no optical codes are detected within image frames, when performing a zoom would cause an optical code to move out of an imaging sensor's view, when image frames that lack adequate quality for scanning purposes are being received, or when a user's intention is not to scan optical codes at the moment (such as when the user's electronic device is moving). Ideally, this helps to limit the use of automatic zooming to situations where the user actually wants or needs to zoom onto an optical code. In addition, the described techniques can help to reduce or eliminate the need for a user to manually zoom onto an optical code when attempting to scan the optical code.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to determining when to zoom onto a barcode or other optical code.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to imaging, including various operations related to determining when to zoom onto a barcode or other optical code. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106).

Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to determining when to zoom onto a barcode or other optical code, such as by training a machine learning model to detect optical codes in image frames.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
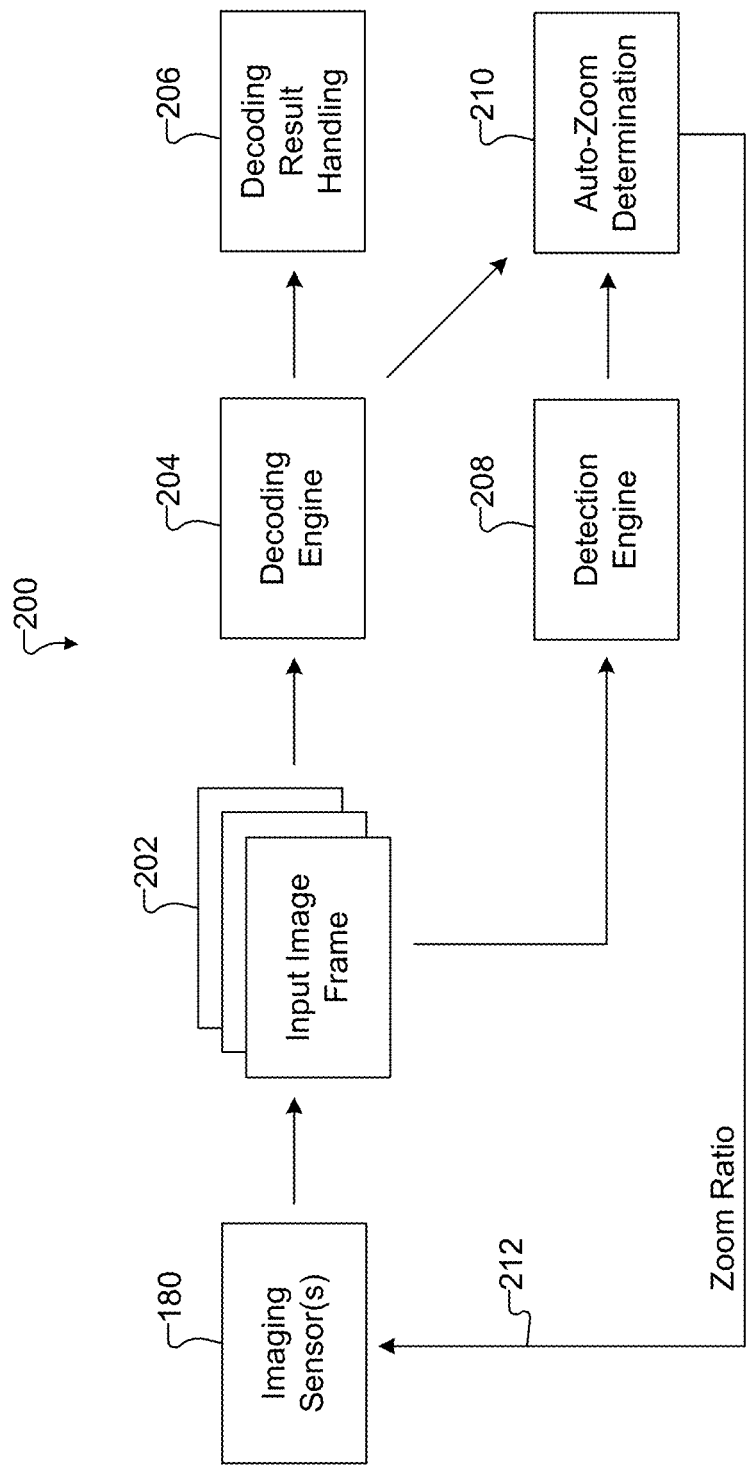
FIG. 2 illustrates an example architecture for determining when to zoom onto a barcode or other optical code according to this disclosure.

FIG. 2 illustrates an example architecture 200 for determining when to zoom onto a barcode or other optical code according to this disclosure. For ease of explanation, the architecture 200 shown in FIG. 2 is described as being used by the electronic device 101 in the network configuration 100 shown in FIG. 1. However, the architecture 200 could be used by any other suitable device(s) and in any other suitable system(s).

As shown in FIG. 2, the architecture 200 includes or is used in conjunction with one or more imaging sensors 180, which can be used to obtain input image frames 202. The input image frames 202 represent image frames captured by the imaging sensor(s) 180 of a scene around the electronic device 101. As described in more detail below, at least some of the input image frames 202 may include one or more one-dimensional barcodes, two-dimensional barcodes (such as QR codes), or other optical codes. An "optical code" generally refers to a scannable optical pattern that encodes information within the pattern. The input image frames 202 may have any suitable resolution(s), and the resolution of each input image frame 202 can depend on the capabilities of the imaging sensor(s) 180 in the electronic device 101 and possibly on one or more user settings affecting the resolution. In some embodiments, the input image frames 202 may represent YUV image frames, although image frames in any other suitable image data space may be used.

At least some of the input image frames 202 are provided to a decoding engine 204, which can process the input image frames 202 in order to identify and decode barcodes or other optical codes in the input image frames 202. For example, the decoding engine 204 may process the input image frames 202 in order to identify locations where optical codes appear within the input image frames 202 and to identify information associated with the optical codes, such as value information and symbology types associated with the optical codes. The decoding engine 204 can use any suitable technique(s) to decode optical codes depending (among other things) on the types of optical codes being decoded. The decoding engine 204 can also generate any suitable outputs based on the decoded optical codes, such as by outputting the value information for each decoded optical code, the symbology type for each decoded optical code, and bounding coordinate location information or other location information defining where the decoded optical code is positioned within an input image frame 202. In some cases, the location of each decoded optical code may be expressed in pixel coordinates within one or more of the input image frames 202. Also, in some cases, the decoding engine 204 may generate and output a recognized optical code list, where the list identifies each optical code in one or more input image frames 202 that is successfully recognized and decoded by the decoding engine 204.

The outputs from the decoding engine 204 are provided to a decoding result handling function 206, which can use the information associated with decoded optical codes in any suitable manner. The specific manner in which decoded optical codes are used can vary depending on the circumstances and application. For example, in some cases, the input image frames 202 may be presented on a display 160 of the electronic device 101, and the decoding result handling function 206 may update the contents presented on the display 160 based on the results of decoding one or more optical codes presented on the display 160. As particular examples, the decoding result handling function 206 may update the display 160 to highlight each optical code that has been successfully decoded and/or to indicate that a user may select a hyperlink or other option for viewing information associated with each decoded optical code. The information associated with a decoded optical code may include any suitable information, such as information from the decoded optical code itself or from a resource, like a website, identified by the optical code. As another example, the decoding result handling function 206 may generate one or more keystroke outputs based on the information associated with each decoded optical code. This may allow, for instance, the decoding result handling function 206 to generate text or other inputs based on the information associated with a decoded optical code. Note, however, that the decoding result handling function 206 may use the outputs from the decoding engine 204 in any other suitable manner.

At least some of the input image frames 202 are also provided to a detection engine 208, which can process the input image frames 202 in order to identify barcodes or other optical codes in the input image frames 202 that may be too small for decoding or that might otherwise have a condition that prevents decoding. The detection engine 208 can generate any suitable outputs based on potential optical codes detected within the image frames 202, such as by outputting bounding coordinate location information or other location information defining a probable position where each potential optical code might be positioned within an input image frame 202 and an associated confidence score. The confidence score can represent a probability or other confidence identifying the likelihood of the potential optical code being present at the probable position. In some cases, the location of each potential optical code may be expressed in pixel coordinates within one or more of the input image frames 202. Also, in some cases, the detection engine 208 may generate and output a detected optical code list, where the list identifies each potential optical code in one or more input image frames 202, the probable position of the potential optical code, and the confidence score of the potential optical code as generated by the detection engine 208.

The outputs from the detection engine 208 are provided to an auto-zoom determination function 210, which can use the information associated with the potential optical codes to control operation of the imaging sensor(s) 180 in order to potentially zoom onto one or more of the potential optical codes. For example, the auto-zoom determination function 210 may process various information (such as the outputs from the detection engine 208, environmental information, and information from the decoding engine 204) in order to determine if zooming is appropriate and to determine a zoom ratio 212 to be applied by the imaging sensor(s) 180 or other component(s). The zoom ratio 212 represents an amount of zooming or magnification to be used by the imaging sensor(s) 180 or other component(s) when capturing or generating additional input image frames 202. For instance, if a potential optical code is detected in one or more initial input image frames 202 but the potential optical code is too small for successful decoding by the decoding engine 204, the auto-zoom determination function 210 can determine a suitable amount of zooming to be applied by the imaging sensor(s) 180 or other component(s) in order to capture one or more subsequent input image frames 202. Ideally, the one or more subsequent input image frames 202 will capture at least one larger version of the potential optical code that can be successfully identified and decoded by the decoding engine 204. In this way, the auto-zoom determination function 210 is able to (i) determine if zooming should be applied in order to capture at least one additional image of one or more optical codes and (ii) if so, determine a suitable zoom ratio 212 to be applied when obtaining the at least one additional image.

As noted above, the auto-zoom determination function 210 may process various types of information, such as the outputs from the detection engine 208, environmental information, and information from the decoding engine 204, in order to determine if zooming is appropriate and (if so) to determine the zoom ratio 212. The following provides various examples of different conditions that may be used by the auto-zoom determination function 210 to determine whether zooming onto an optical code detected within an input image frame 202 should be performed. Note that the different conditions described below are examples only and that any other or additional conditions (individually or in any desired combination) may be used by the auto-zoom determination function 210.

Figure 3:
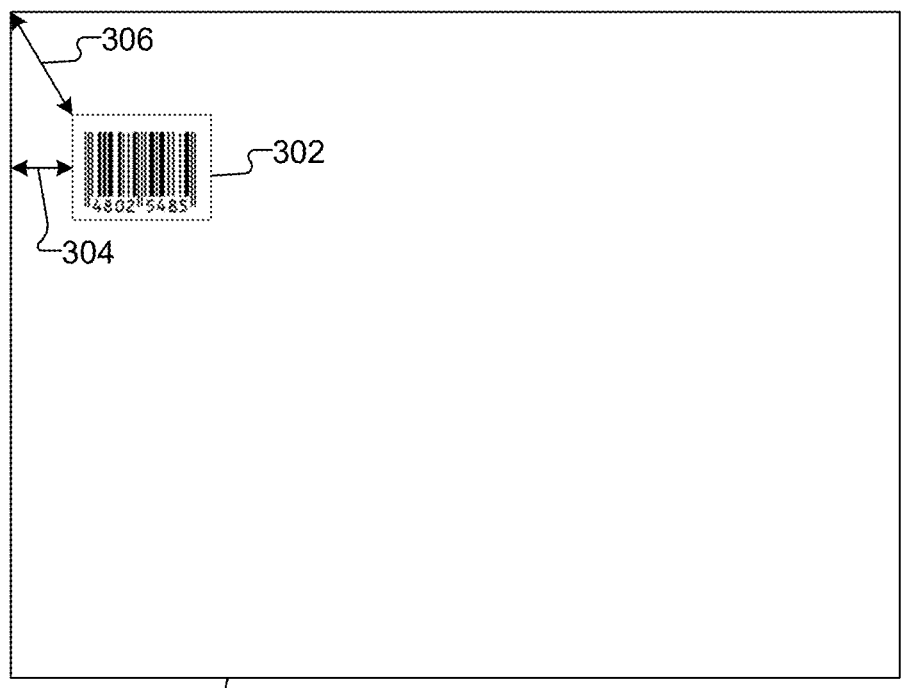
FIG. 3 illustrates an example condition used to determine whether to zoom onto a barcode or other optical code according to this disclosure.

As a first example, the auto-zoom determination function 210 may use one or more distances of an optical code captured in an input image frame 202 from an edge or corner of the input image frame 202 when determining whether to automatically zoom onto the optical code. For instance, FIG. 3 illustrates an example condition used to determine whether to zoom onto a barcode or other optical code according to this disclosure. As shown in FIG. 3, an input image frame 202 captures an optical code 302, which in this example is enlarged for ease of illustration and explanation. Here, the auto-zoom determination function 210 may identify a distance 304 between the optical code 302 and a nearest edge of the input image frame 202 and/or a distance 306 between the optical code 302 and a nearest corner of the input image frame 202. If the measured distance 304 or 306 is greater than a threshold distance (or if both distances 304 and 306 are greater than one or more threshold distances), this can be used as an indicator that zooming onto the optical code 302 can be automatically performed. If not, the auto-zoom determination function 210 may determine that zooming should not be performed. Among other things, the use of the distance(s) 304, 306 can help the auto-zoom determination function 210 determine if there is adequate room within the imaging space of the imaging sensor(s) 180 for zooming onto the optical code 302. In some embodiments, the determination of the distance(s) 304, 306 may occur only for optical codes 302 having an associated confidence score above a threshold confidence score, which can help to reduce processing and limit examination to optical codes 302 having adequately high confidence scores.

As a second example, the auto-zoom determination function 210 may use the size of the optical code 302 within an input image frame 202 when determining whether to automatically zoom onto the optical code 302. For example, the auto-zoom determination function 210 may calculate an occupancy rate of the optical code 302, where the occupancy rate defines the relative size of the optical code 302 compared to the overall size of the input image frame 202. Thus, the occupancy rate of the optical code 302 within the input image frame 202 can be based on a ratio of an area of the optical code 302 within the input image frame 202 and an area of the input image frame 202 itself. As a particular example, the area of the optical code 302 within the input image frame 202 may represent the pixel area of the optical code 302 (such as the number of pixels containing the optical code 302), and the area of the input image frame 202 may represent the total number of pixels in the input image frame 202. If the calculated occupancy rate of the optical code 302 is less than a threshold occupancy rate, this can be used as an indicator that zooming onto the optical code 302 can be automatically performed. If not, the auto-zoom determination function 210 may determine that zooming should not be performed. Among other things, the use of the occupancy rate can help the auto-zoom determination function 210 determine if the optical code 302 is currently too small within the input image frame 202. In some embodiments, the determination of the occupancy rate may occur only for optical codes 302 having an associated confidence score above a threshold confidence score, which can help to reduce processing and limit examination to optical codes 302 having adequately high confidence scores.

Figure 4A:
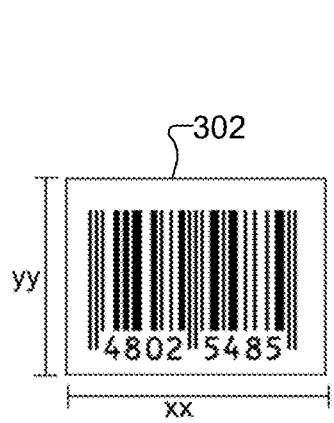
FIGS. 4A through 4C illustrate example techniques for identifying an occupancy rate of a barcode or other optical code according to this disclosure.
Figure 4B:
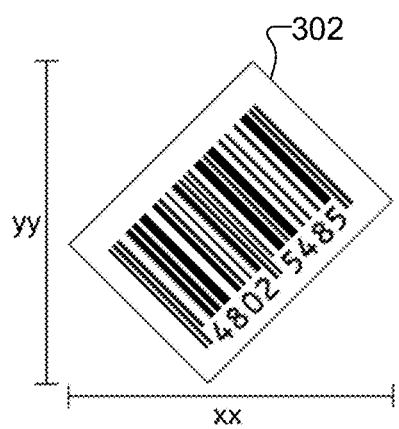
Figure 4C:
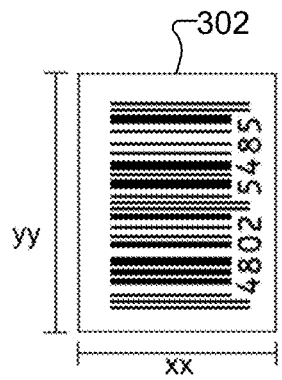

FIGS. 4A through 4C illustrate example techniques for identifying an occupancy rate of a barcode or other optical code 302 according to this disclosure. In all of FIGS. 4A through 4C, the occupancy rate of the optical code 302 may be defined as the product of a horizontal measure (xx) of the optical code 302 and a vertical measure (yy) of the optical code 302. In these particular examples, the optical code 302 is horizontal in FIG. 4A, rotated in FIG. 4B, and vertical in FIG. 4C. While the occupancy rate in FIGS. 4A and 4C can represent the area of the optical code 302 itself, the occupancy rate in FIG. 4B will be larger than the optical code 302 itself. This can be done merely as a matter of convenience, and other techniques (such as those identifying the actual area of the rotated optical code 302 itself in FIG. 4B may be used). The input image frame 202 may be assumed to have dimensions of x×y, where x represents the number of pixels horizontally and y represents the number of pixels vertically. In all three cases here, the occupancy rate may be numerically expressed as (xx×yy)/(x×y)×100%.

Note that any suitable threshold occupancy rate may be used here when determining whether or not to automatically zoom onto an optical code 302. In some cases, for instance, the threshold occupancy rate may be set to a value of 0.35%. Thus, if an optical code 302 occupies 0.35% or less of the total area of an input image frame 202, the auto-zoom determination function 210 may determine to automatically zoom onto the optical code 302. However, this particular threshold occupancy rate is for illustration only and can easily vary depending on the circumstances. For example, the capabilities of the decoding engine 204 in processing the input image frames 202 can affect the threshold occupancy rate, such as when the threshold occupancy rate should be lower when the decoding engine 204 is able to decode optical codes 302 that are smaller and when the threshold occupancy rate should be higher when the decoding engine 204 is only able to decode optical codes 302 that are larger.

As a third example, the auto-zoom determination function 210 may use detected motion of the electronic device 101 in determining whether to automatically zoom onto an optical code 302. For example, the auto-zoom determination function 210 may determine whether the electronic device 101 is relatively stationary or appears to be moving by at least a threshold amount (such as a threshold speed). If the electronic device 101 is relatively stationary, this can be indicative that a user of the electronic device 101 is attempting to scan an optical code 302. If the electronic device 101 is moving by at least the threshold amount, this can be indicative that the user of the electronic device 101 is walking, running, or otherwise moving and therefore is unlikely to be attempting to scan an optical code 302.

As a fourth example, the auto-zoom determination function 210 may use the quality of an input image frame 202 in determining whether to automatically zoom onto an optical code 302. For example, the auto-zoom determination function 210 may determine whether an image quality of an input image frame 202 exceeds a threshold quality. If not, this can be indicative that zooming onto an optical code 302 will likely not result in image data of adequate quality for decoding purposes, and automatic zooming may not be performed. Otherwise, image data of adequate quality can be indicative that zooming onto an optical code 302 might result in image data of adequate quality for decoding purposes.

As a fifth example, the auto-zoom determination function 210 may use the output of the decoding engine 204 to determine whether the decoding engine 204 has successfully decoded an optical code 302. If so, the auto-zoom determination function 210 can determine that no zooming onto the optical code 302 is needed or required since the optical code 302 has already been decoded by the decoding engine 204. This can help to reduce or avoid unwanted zoom situations by preventing zooming onto an optical code 302 that has already been detected and decoded.

Again, note that any one of these conditions, any subset of these conditions, or all of these conditions may be used by the auto-zoom determination function 210 when attempting to determine whether to zoom onto an optical code 302. Among other things, the auto-zoom determination function 210 here can use one or more of these or other or additional conditions in an attempt to limit auto-zooming only to those situations where a user might want auto-zooming to occur.

Since zooming when a user does not wish to zoom can significantly impact the user experience in a negative way, the various conditions described above can help to reduce or prevent unwanted zooming when it appears likely that the electronic device 101 is not being used for optical code scanning.

In some embodiments, the decoding engine 204 and the detection engine 208 may operate in parallel when processing the input image frames 202. Thus, for example, the decoding engine 204 may attempt to identify and decode optical codes 302 within the input image frames 202 while the detection engine 208 is attempting to identify optical codes 302 satisfying one or more conditions within the input image frames 202. Among other things, this may allow the decoding engine 204 to make a determination whether an optical code 302 can be successfully identified and decoded without waiting for the detection engine 208 to process the input image frames 202 and determine whether zooming should be performed. In some cases, if the decoding engine 204 is able to successfully identify and decode an optical code 302 in an input image frame 202, the processing by the detection engine 208 can be terminated since there may be no need to zoom onto the optical code 302 for decoding purposes. However, this need not be the case, and sequential processing by the decoding engine 204 and the detection engine 208 may be performed.

If a determination is made to perform auto-zooming here, the auto-zoom determination function 210 can generate the zoom ratio 212 in any suitable manner. For example, the auto-zoom determination function 210 could determine a zoom ratio 212 that would allow the optical code 302 to remain completely visible within at least one subsequent image frame 202 captured using that zoom ratio 212. Once the imaging sensor(s) 180 or other component(s) perform a zoom operation using the zoom ratio 212, at least one additional input image frame 202 can be captured, and the process described above can be repeated. As a result, the decoding engine 204 can process the at least one additional input image frame 202 and attempt to decode the optical code 302, and the detection engine 208 and the auto-zoom determination function 210 can process the at least one additional input image frame 202 and determine whether additional zooming is needed. If and when the optical code 302 is successfully decoded by the decoding engine 204, the current zoom setting may be maintained or may automatically return to the original zoom setting. Note that zooming here may be performed optically or digitally (computationally).

Although FIGS. 2 through 4C illustrate one example of an architecture 200 for determining when to zoom onto a barcode or other optical code 302 and related details, various changes may be made to FIGS. 2 through 4C. For example, various components or functions shown in FIG. 2 may be combined, further subdivided, rearranged, replicated, or omitted and additional components or functions can be added according to particular needs. Also, each input image frame 202 may include any number of optical codes 302 at any locations within the input image frame 202, and each optical code 302 may have any other suitable form. In addition, the occupancy rate for an optical code 302 may be determined in any other suitable manner.

Figure 5:
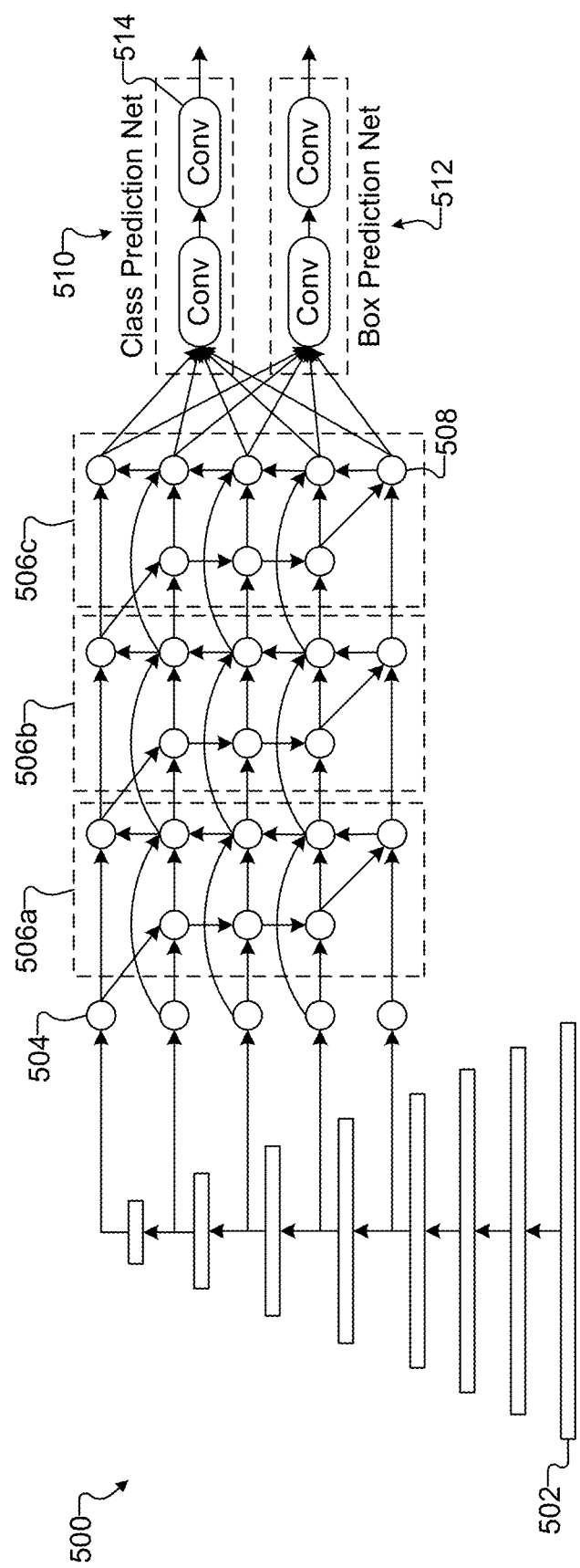
FIG. 5 illustrates an example machine learning model for use in detecting barcodes or other optical codes in image frames according to this disclosure.

FIG. 5 illustrates an example machine learning model 500 for use in detecting barcodes or other optical codes 302 in image frames 202 according to this disclosure. In some embodiments, the machine learning model 500 can be used to at least partially implement the functionality of the detection engine 208. In other words, the machine learning model 500 may be used here to identify optical codes 302 that might be too small or that might otherwise not be decodable by the decoding engine 204 in the architecture 200 shown in FIG. 2.

As shown in FIG. 5, the machine learning model 500 represents a specific implementation of a You Only Look Once version 5 (YOLOv5) object detection model. Here, the machine learning model 500 includes various convolutional layers 502, which are used to process an input image frame 202 and generate feature maps 504 associated with the input image frame 202. The convolutional layers 502 here are shown as getting progressively smaller, which generally indicates that the convolutional layers 502 progressively generate smaller feature maps 504 but with greater depths. Each convolutional layer 502 may include or be associated with a pooling layer, such as a max pooling layer. Note that the number of convolutional layers 502 shown in FIG. 5 is for illustration only, and other numbers of convolutional layers 502 may be used here. In general, the convolutional layers 502 are used to extract features from the input image frame 202 that have been determined during training to be relevant to the specific task at hand (such as identifying smaller optical codes 302 in this example).

The feature maps 504 are provided to and processed using multiple weighted bi-directional feature pyramid network (BiFPN) layers 506a-506c. In this example, there are three BiFPN layers 506a-506c, although other numbers of BiFPN layers 506a-506c may be used here. Each BiFPN layer 506a-506c generally operates to fuse or combine features (either features in the original feature maps 504 or fused features 508 generated by a previous BiFPN layer) while performing top-down and bottom-up multi-scale feature fusion. Each BiFPN layer 506a-506c uses learnable weights that represent the importance of different features, and these learnable weights are determined during training of the machine learning model 500. As a result of this processing, the BiFPN layers 506a-506c can be used to fuse features from different convolutional layers 502 in order to combine information from different scales, which allows the machine learning model 500 to detect objects having different scales. Among other things, this allows the machine learning model 500 to detect optical codes 302 having smaller sizes within the input image frames 202.

The fused features 508 output from the final BiFPN layer 506c are provided to a class prediction network 510 and a box prediction network 512, each of which may be implemented using one or more additional convolutional layers 514. The class prediction network 510 generally operates to identify an object class for each object detected within the input image frame 202, where each object class represents a different type of object. The box prediction network 512 generally operates to identify a boundary for each object detected within the input image frame 202, where each boundary represents a box or other boundary around the object. When used to implement the detection engine 208, this allows the detection engine 208 to identify potential optical codes 302 within input image frames 202 and to identify probable positions of those potential optical codes 302 within the input image frames 202. That information can be provided to the auto-zoom determination function 210 for use in determining whether to auto-zoom onto one or more of the potential optical codes 302.

One potential benefit of using this type of structure for the machine learning model 500 is that the machine learning model 500 can be implemented using a one-stage detector having multiple scale detection capabilities. Thus, the machine learning model 500 is able to detect objects at various scales and can be trained to detect (among other things) relatively small optical codes 302. Another potential benefit of using this type of structure for the machine learning model 500 is that the model 500 uses an "EfficientNet" backbone, which increases the feasibility of twisting the depth of the model 500 to fit within different computational requirements. In some cases, for instance, the smallest efficient of the machine learning model 500 can be selected since it uses less time to perform computations, which can be desirable for mobile electronic devices.

The machine learning model 500 can be trained in any suitable manner to identify potential optical codes 302. For example, in some cases, one or more training datasets may be obtained, where the one or more training datasets include training images containing known optical codes. In order to support use within the architecture 200, the training images can be processed in order to randomly down-scale the image data in at least parts of the training images and thereby reduce the sizes of the known optical codes. Other modifications can be made to the quality or other characteristics of the known optical codes in the training images. This helps to generate training data that includes relatively small optical codes. In some cases, the relatively small optical codes can be inserted into black backgrounds or other images, possibly while being randomly combined so that the resulting images contain one or more relatively small optical codes. The machine learning model 500 can be trained using the resulting images to detect the relatively small optical codes within the images. Note, however, that the machine learning model 500 may be trained in any other suitable manner, such as when training images already containing relatively small optical codes are obtained and used.

Although FIG. 5 illustrates one example of a machine learning model 500 for use in detecting barcodes or other optical codes 302 in image frames 202, various changes may be made to FIG. 5. For example, the machine learning model 500 may have any other suitable machine learning architecture. Also, the detection engine 208 may be implemented in any other suitable manner and need not be implemented using a machine learning model.

It should be noted that the functions shown in FIGS. 2 through 5 or described above can be implemented in an electronic device 101, 102, 104, server 106, or other device(s) in any suitable manner. For example, in some embodiments, at least some of the functions shown in FIGS. 2 through 5 or described above can be implemented or supported using one or more software applications or other software instructions that are executed by the processor(s) 120 of the electronic device 101, 102, 104, server 106, or other device(s). In other embodiments, at least some of the functions shown in FIGS. 2 through 5 or described above can be implemented or supported using dedicated hardware components. In general, the functions shown in FIGS. 2 through 5 or described above can be performed using any suitable hardware or any suitable combination of hardware and software/firmware instructions. Also, the functions shown in FIGS. 2 through 5 or described above can be performed by a single device or by multiple devices. For instance, the server 106 may train the machine learning model 500 and then deploy the trained machine learning model 500 to one or more other devices, such as the electronic device 101, for use during inferencing.

Figure 6A:
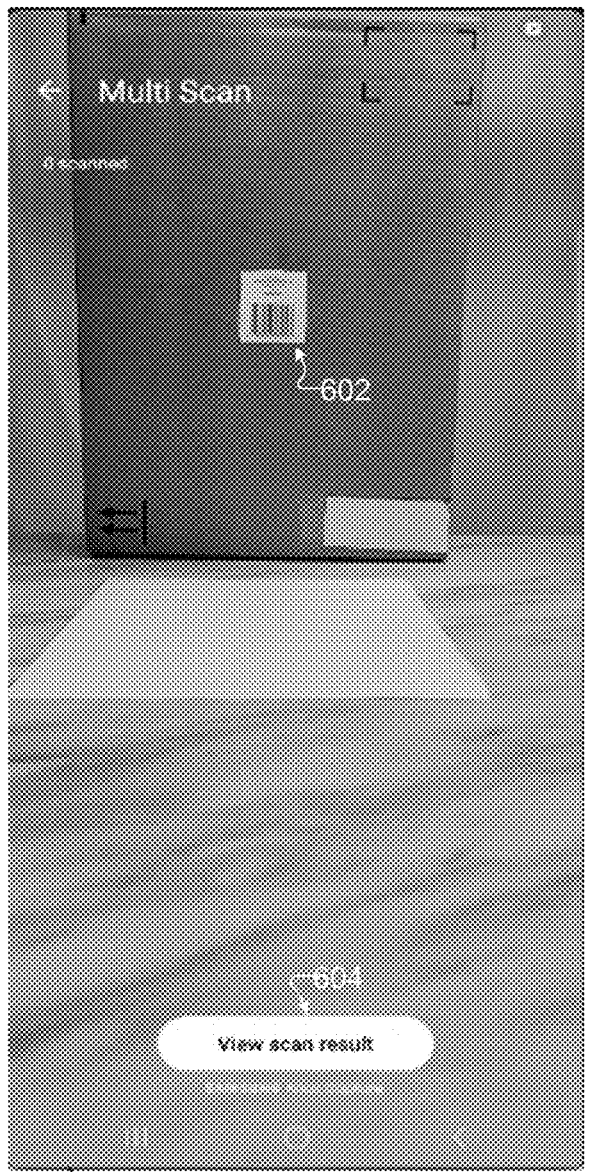
FIGS. 6A and 6B illustrate example results that may be obtained when zooming onto a barcode or other optical code according to this disclosure.
Figure 6B:
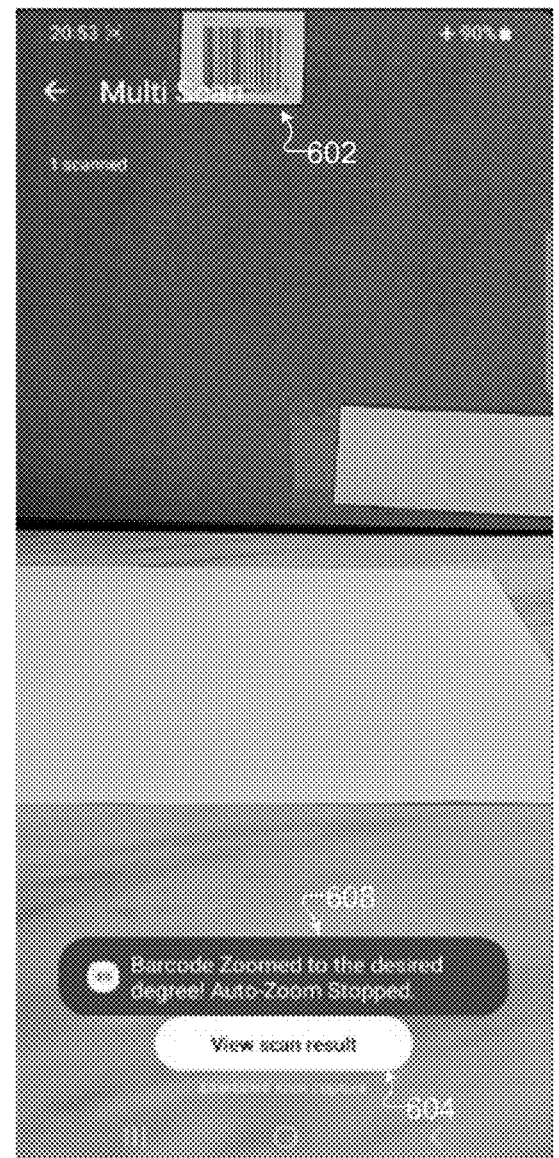

FIGS. 6A and 6B illustrate example results that may be obtained when zooming onto a barcode or other optical code 302 according to this disclosure. More specifically, FIG. 6A illustrates an example image frame 600 containing an optical code 602 that cannot be decoded by the decoding engine 204. In some embodiments, the lack of decoding by the decoding engine 204 can be indicated using the lack of any highlighting or other indicator around the optical code 602. While a control 604 for viewing a scan result is provided, the control 604 may be disabled or return a message indicating that no optical code has been successfully decoded by the decoding engine 204.

FIG. 6B illustrates another example image frame 606 containing the same optical code 602, but the image frame 606 is generated by zooming onto the optical code 602. The zooming allows the decoding engine 204 to obtain at least one additional input image frame 202 and decode the optical code 602. In some embodiments, the optical code 602 here may be highlighted or some other indicator may be provided to show that the optical code 602 has been successfully decoded by the decoding engine 204. Selecting the control 604 for viewing the scan result can present the user with information associated with the optical code 602, such as information encoded within the optical code 602 or information from a resource (like a website) identified by the optical code 602. A notification 608 may optionally be presented informing the user that auto-zooming was automatically performed in order to zoom onto the optical code 602.

Although FIGS. 6A and 6B illustrate one example of results that may be obtained when zooming onto a barcode or other optical code 302, various changes may be made to FIGS. 6A and 6B. For example, the contents of the image frames 600 and 606 can easily vary based on the circumstances, and the contents of the specific image frames 600 and 606 shown here do not limit the scope of this disclosure. Also, the optical code 602 may have any other suitable form and may have any other suitable position within each of the image frames 600 and 606 before and after zooming.

Note that the functionality for automatically zooming onto optical codes may be used in any suitable applications or use cases. For example, electronic devices 101 of consumers may support this functionality in order to enable effective scanning of barcodes or other optical codes seen by consumers in restaurants or stores, on televisions, or in any other suitable locations. As more-specific example applications or use cases, workers in healthcare, retail, and other frontline industries may use electronic devices 101 supporting this functionality in order to scan barcodes or other optical codes that are far away or too small to be scanned normally. As a particular example, in various retail industries, product shelves can utilize a four-tiered system with shelving that is up to 84 inches tall, and it is often inconvenient for employees who are within a normal height range to scan items that are on top shelves. The described functionality can help in these or other situations, which can increase employee productivity and avoid potential injury. As another particular example, employees in manufacturing and other industries may often need to wear gloves or other hand coverings for their work, which can often interfere with the employees making touch gestures on the displays 160 of their electronic devices 101. The described functionality can offer a more convenient and effective way to zoom and scan optical codes that are far away or small, such as by reducing or avoiding the need for the employees to remove their gloves or other hand coverings in order to make pinching gestures on the displays 160 of their electronic devices 101.

Figure 7:
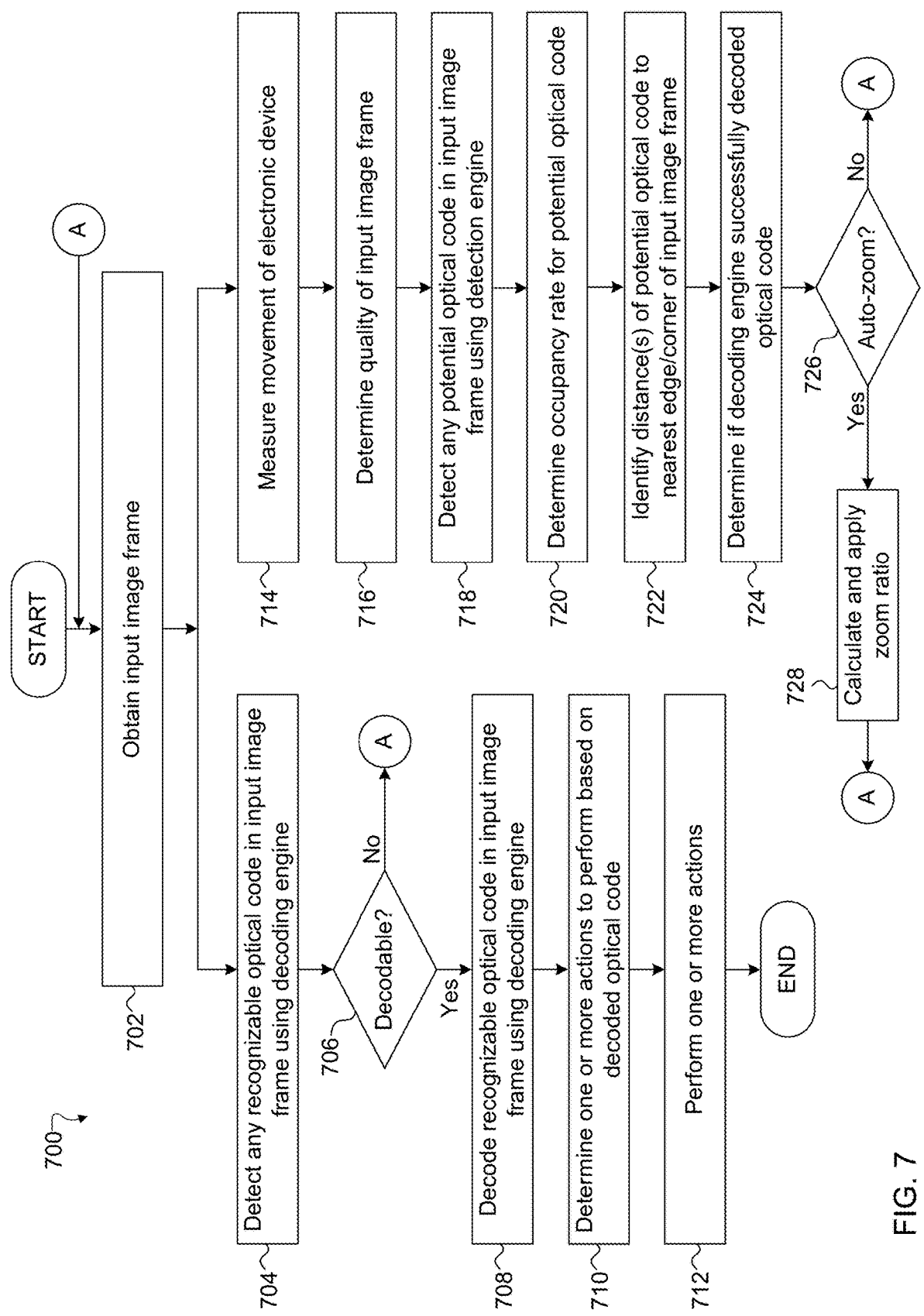
FIG. 7 illustrates an example method for determining when to zoom onto a barcode or other optical code according to this disclosure.

FIG. 7 illustrates an example method 700 for determining when to zoom onto a barcode or other optical code according to this disclosure. For ease of explanation, the method 700 is described as being performed by the electronic device 101 in the network configuration 100 shown in FIG. 1 using the architecture 200 shown in FIG. 2. However, the method 700 may be performed using any other suitable device(s) supporting any other suitable architecture(s) and in any other suitable system(s).

As shown in FIG. 7, at least one input image frame of a scene is obtained at step 702. This may include, for example, the processor 120 of the electronic device 101 obtaining at least one input image frame 202 using one or more imaging sensors 180 of the electronic device 101. The at least one input image frame 202 can be captured using an initial zoom setting, such as a zoom setting currently selected by a user or a default or current zoom setting being used by a "camera" application or other application of the electronic device 101. The at least one input image frame 202 can be processed in parallel using different image processing operations and other operations.

In one processing branch, any recognizable optical code within the at least one input image frame is detected using a decoding engine at step 704. This may include, for example, the processor 120 of the electronic device 101 executing the decoding engine 204 in order to identify any recognizable optical codes 302 within each input image frame 202. A determination is made whether any of the detected optical codes is decodable at step 706. This may include, for example, the processor 120 of the electronic device 101 using the decoding engine 204 to try and decode any recognizable optical codes 302 detected within each input image frame 202. If decoding is not possible, the process can return to an earlier step, such as by returning to step 702 in order to obtain and process another input image frame or frames 202. If decoding is possible, decoding of at least one recognizable optical code in the input image frame(s) occurs at step 708. This may include, for example, the processor 120 of the electronic device 101 using the decoding engine 204 to extract information encoded in at least one recognizable optical code 302. One or more actions to be performed based on the decoded optical code(s) are identified at step 710 and performed or initiated at step 712. This may include, for example, the processor 120 of the electronic device 101 executing the decoding result handling function 206 in order to determine what function or functions should be performed or initiated based on the at least one decoded optical code 302.

In another processing branch, movement of an electronic device is measured at step 714, and a quality of the input image frame(s) is identified at step 716. This may include, for example, the processor 120 of the electronic device 101 using one or more sensors 180 (such as an IMU) to detect or measure movement of the electronic device 101 or using differences between multiple input image frames 202 captured over time to detect or measure movement of the electronic device 101. This may also include the processor 120 of the electronic device 101 analyzing the input image frame(s) 202 in order to estimate noise or other characteristics indicative of the quality of the input image frame(s) 202.

Any potential optical code within the at least one input image frame is detected using a detection engine at step 718. This may include, for example, the processor 120 of the electronic device 101 executing the detection engine 208 in order to identify any potential optical codes 302 within each input image frame 202. In some cases, the detection engine 208 may identify a probable position of each potential optical code 302 and a confidence score representing a likelihood of the potential optical code 302 being at the probable position. For each potential optical code, an occupancy rate for the potential optical code is determined at step 720, and one or more distances of the potential optical code from an edge and/or corner of the associated input image frame are identified at step 722. This may include, for example, the processor 120 of the electronic device 101 using the auto-zoom determination function 210 to calculate a ratio between the area (such as the number of pixels) of each potential optical code 302 and the area (such as the total number of pixels) of the associated input image frame 202. This may also include the processor 120 of the electronic device 101 using the auto-zoom determination function 210 to calculate (i) a distance 304 from the potential optical code 302 and the nearest edge of the associated input image frame 202 and/or (ii) a distance 306 from the potential optical code 302 and the nearest corner of the associated input image frame 202. A determination is made whether the decoding engine successfully decoded the potential optical code at step 724. This may include, for example, the processor 120 of the electronic device 101 using the auto-zoom determination function 210 to determine whether the decoding engine 204 successfully decoded the potential optical code 302. Note that at least some of this information (such as the occupancy rate and distance(s) 304, 306) may be determined only for each potential optical code 302 having a confidence score higher than a threshold confidence score.

A decision is made whether to perform auto-zooming at step 726. This may include, for example, the processor 120 of the electronic device 101 using the auto-zoom determination function 210 to process the information obtained previously in order to determine whether to automatically zoom onto any particular one of the potential optical codes 302. In some cases, the auto-zoom determination function 210 may determine if the measured movement does or does not exceed a movement threshold, if the image quality does or does not exceed a quality threshold, if the occupancy rate does or does not exceed an occupancy rate threshold, if the distance or distances do or do not exceed at least one distance threshold, and if the decoding engine 204 was successful. As a particular example, the auto-zoom determination function 210 may determine to perform auto-zooming if the following combination of conditions is satisfied: the measured movement does not exceed the movement threshold, the image quality does exceed the quality threshold, the occupancy rate does not exceed the occupancy rate threshold, the distance or distances do exceed the at least one distance threshold, and the decoding engine 204 was not successful. As noted above, however, other individual conditions or combinations of conditions may be used to determine whether to zoom onto any particular potential optical code 302.

If the decision is made to not perform auto-zooming, the process can return to an earlier step, such as by returning to step 702 in order to obtain and process another input image frame or frames 202. If the decision is made to perform auto-zooming, a zoom ratio is calculated and applied at step 728. This may include, for example, the processor 120 of the electronic device 101 using the auto-zoom determination function 210 to determine a zoom ratio 212 that could be applied when capturing at least one additional image frame 202, where the zoom ratio 212 would allow an entire potential optical code 302 to be captured in the at least one additional image frame 202. This may also include the processor 120 of the electronic device 101 applying the zoom ratio 212, such as by modifying operation(s) of the imaging sensor(s) 180 or other component(s) used to capture or generate the at least one additional image frame 202. The process may return to step 702 in order to obtain and process the at least one additional image frame 202 based on the applied zoom ratio 212.

Although FIG. 7 illustrates one example of a method 700 for determining when to zoom onto a barcode or other optical code, various changes may be made to FIG. 7. For example, while shown as including specific series and parallel collections of steps, various steps in FIG. 7 may be rearranged to occur serially, overlap, occur in parallel, occur in a different order, or occur any number of times (including zero times). As a particular example, while two sets of steps 704-712 and 714-728 are shown here as occurring in parallel, these steps may occur serially. Also, while FIG. 7 illustrates the use of a specific set of conditions for determining whether auto-zooming should be initiated, the method 700 may use any single condition or any combination of conditions when determining whether auto-zooming should be initiated. In addition, the process shown here can be repeated for any number of image frames 202 captured by an electronic device 101, such as a continuous stream of image frames 202.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processor of an electronic device, a first image frame captured using at least one imaging sensor;
   determining, using the at least one processor, that an optical code is contained within the first image frame;
   determining, using the at least one processor, whether to automatically zoom onto the optical code;
   in response to determining to automatically zoom onto the optical code, identifying, using the at least one processor, a zoom ratio to be applied; and
   controlling, using the at least one processor, the at least one imaging sensor to capture a second image frame that is zoomed onto the optical code using the zoom ratio;
   wherein determining whether to automatically zoom onto the optical code comprises:
   identifying a distance between the optical code and a nearest edge or a nearest corner in the first image frame; and
   determining to automatically zoom onto the optical code based on the identified distance being greater than a threshold distance.

2. The method of claim 1, wherein determining whether to automatically zoom onto the optical code further comprises:
   identifying a probable position of the optical code within the first image frame and a confidence score representing a likelihood of the optical code being at the probable position;
   in response to determining that the confidence score exceeds a threshold confidence score, determining an occupancy rate of the optical code within the first image frame based on a ratio of an area of the optical code within the first image frame and an area of the first image frame; and
   determining to automatically zoom onto the optical code based on the occupancy rate being less than a threshold occupancy rate.

3. The method of claim 1, wherein determining whether to automatically zoom onto the optical code further comprises:
   determining whether the at least one imaging sensor was moving by at least a threshold amount when the first image frame was captured; and
   determining to automatically zoom onto the optical code based on the at least one imaging sensor not moving by at least the threshold amount when the first image frame was captured.

4. The method of claim 1, wherein determining whether to automatically zoom onto the optical code further comprises:
   determining an image quality of the first image frame; and
   determining to automatically zoom onto the optical code based on the image quality exceeding a threshold quality.

5. The method of claim 1, further comprising:
   attempting to decode the optical code using the first image frame in parallel with determining whether to automatically zoom onto the optical code;
   wherein determining whether to automatically zoom onto the optical code comprises determining to automatically zoom onto the optical code based on failing to decode the optical code using the first image frame.

6. The method of claim 1, wherein controlling the at least one imaging sensor to capture the second image frame comprises:
   automatically controlling the at least one imaging sensor to zoom onto the optical code using the zoom ratio; and
   automatically controlling the at least one imaging sensor to capture the second image frame.

7. The method of claim 1, wherein the optical code comprises a one-dimensional barcode or a two-dimensional barcode.

8. An electronic device comprising:
   at least one imaging sensor configured to capture a first image frame; and
   at least one processor configured to:
   determine that an optical code is contained within the first image frame;
   determine whether to automatically zoom onto the optical code;
   in response to determining to automatically zoom onto the optical code, identify a zoom ratio to be applied; and
   control the at least one imaging sensor to capture a second image frame that is zoomed onto the optical code using the zoom ratio;
   wherein, to determine whether to automatically zoom onto the optical code, the at least one processor is configured to:
   identify a distance between the optical code and a nearest edge or a nearest corner in the first image frame; and
   determine to automatically zoom onto the optical code based on the identified distance being greater than a threshold distance.

9. The electronic device of claim 8, wherein, to determine whether to automatically zoom onto the optical code, the at least one processor is further configured to:
   identify a probable position of the optical code within the first image frame and a confidence score representing a likelihood of the optical code being at the probable position;
   in response to determining that the confidence score exceeds a threshold confidence score, determine an occupancy rate of the optical code within the first image frame based on a ratio of an area of the optical code within the first image frame and an area of the first image frame; and determine to automatically zoom onto the optical code based on the occupancy rate being less than a threshold occupancy rate.

10. The electronic device of claim 8, wherein, to determine whether to automatically zoom onto the optical code, the at least one processor is further configured to:

determine whether the at least one imaging sensor was moving by at least a threshold amount when the first image frame was captured; and determine to automatically zoom onto the optical code based on the at least one imaging sensor not moving by at least the threshold amount when the first image frame was captured.

11. The electronic device of claim 8, wherein, to determine whether to automatically zoom onto the optical code, the at least one processor is further configured to:

determine an image quality of the first image frame; and determine to automatically zoom onto the optical code based on the image quality exceeding a threshold quality.

12. The electronic device of claim 8, wherein:

the at least one processor is further configured to attempt to decode the optical code using the first image frame in parallel with determining whether to automatically zoom onto the optical code; and to determine whether to automatically zoom onto the optical code, the at least one processor is further configured to determine to automatically zoom onto the optical code based on failing to decode the optical code using the first image frame.

13. The electronic device of claim 8, wherein, to control the at least one imaging sensor to capture the second image frame, the at least one processor is further configured to:

automatically control the at least one imaging sensor to zoom onto the optical code using the zoom ratio; and automatically control the at least one imaging sensor to capture the second image frame.

14. The electronic device of claim 8, wherein the optical code comprises a one-dimensional barcode or a two-dimensional barcode.

15. A non-transitory machine-readable medium containing instructions that when executed cause at least one processor of an electronic device to:

obtain a first image frame captured using at least one imaging sensor;

determine that an optical code is contained within the first image frame;

determine whether to automatically zoom onto the optical code;

in response to determining to automatically zoom onto the optical code, identify a zoom ratio to be applied; and control the at least one imaging sensor to capture a second image frame that is zoomed onto the optical code using the zoom ratio;

wherein the instructions that when executed cause the at least one processor to determine whether to automatically zoom onto the optical code comprise instructions that when executed cause the at least one processor to:

identify a distance between the optical code and a nearest edge or a nearest corner in the first image frame; and determine to automatically zoom onto the optical code based on the identified distance being greater than a threshold distance.

16. The non-transitory machine-readable medium of claim 15, wherein the instructions that when executed cause the at least one processor to determine whether to automatically zoom onto the optical code further comprise instructions that when executed cause the at least one processor to:

identify a probable position of the optical code within the first image frame and a confidence score representing a likelihood of the optical code being at the probable position;

in response to determining that the confidence score exceeds a threshold confidence score, determine an occupancy rate of the optical code within the first image frame based on a ratio of an area of the optical code within the first image frame and an area of the first image frame; and determine to automatically zoom onto the optical code based on the occupancy rate being less than a threshold occupancy rate.

17. The non-transitory machine-readable medium of claim 15, wherein the instructions that when executed cause the at least one processor to determine whether to automatically zoom onto the optical code further comprise instructions that when executed cause the at least one processor to:

determine whether the at least one imaging sensor was moving by at least a threshold amount when the first image frame was captured; and determine to automatically zoom onto the optical code based on the at least one imaging sensor not moving by at least the threshold amount when the first image frame was captured.

18. The non-transitory machine-readable medium of claim 15, wherein the instructions that when executed cause the at least one processor to determine whether to automatically zoom onto the optical code further comprise instructions that when executed cause the at least one processor to:

determine an image quality of the first image frame; and determine to automatically zoom onto the optical code based on the image quality exceeding a threshold quality.

19. The non-transitory machine-readable medium of claim 15, further containing instructions that when executed cause the at least one processor to attempt to decode the optical code using the first image frame in parallel with determining whether to automatically zoom onto the optical code;

wherein the instructions that when executed cause the at least one processor to determine whether to automatically zoom onto the optical code further comprise instructions that when executed cause the at least one processor to determine to automatically zoom onto the optical code based on failing to decode the optical code using the first image frame.

20. The non-transitory machine-readable medium of claim 15, wherein the instructions that when executed cause the at least one processor to control the at least one imaging sensor to capture the second image frame comprise instructions that when executed cause the at least one processor to:

automatically control the at least one imaging sensor to zoom onto the optical code using the zoom ratio; and automatically control the at least one imaging sensor to capture the second image frame.

* * * * *